(12) United States Patent
Ross

(10) Patent No.: US 7,394,167 B2
(45) Date of Patent: Jul. 1, 2008

(54) EXPRESS POWER LOAD CENTER

(75) Inventor: Kermit L. Ross, Frisco, TX (US)

(73) Assignee: Infratel Communications, Inc., Montgomeryville, PA (US)

( * ) Notice: Subject to any disclaimer, the term of this patent is extended or adjusted under 35 U.S.C. 154(b) by 331 days.

(21) Appl. No.: 11/196,974

(22) Filed: Aug. 4, 2005

(65) Prior Publication Data

US 2006/0039402 A1    Feb. 23, 2006

Related U.S. Application Data

(60) Provisional application No. 60/662,074, filed on Mar. 15, 2005, provisional application No. 60/662,073, filed on Mar. 15, 2005, provisional application No. 60/662,072, filed on Mar. 15, 2005, provisional application No. 60/628,433, filed on Nov. 16, 2004, provisional application No. 60/598,861, filed on Aug. 4, 2004.

(51) Int. Cl.
    *H02J 1/10*    (2006.01)

(52) U.S. Cl. .......................................................... 307/19
(58) Field of Classification Search .................... 307/19
    See application file for complete search history.

(56) References Cited

U.S. PATENT DOCUMENTS 5,845,190 A * 12/1998 Bushue et al. ............... 725/130
6,334,219 B1 * 12/2001 Hill et al. ..................... 725/106
7,116,761 B2 * 10/2006 Ashton et al. ............... 379/56.2

* cited by examiner

*Primary Examiner*—Robert L. Deberadinis
(74) *Attorney, Agent, or Firm*—RG & R Associates

(57) ABSTRACT

A power load center comprises a first terminal block adapted to receive multiple high voltage DC power feeder pairs, a protector block adapted to receive the multiple high voltage DC power pairs from the first terminal block and to aggregate them, a DC to DC voltage converter adapted to receive the aggregate feeder pairs and convert them to −48V DC, and a power tap bus or second terminal block adapted to receive the −48V DC power and to output it as multiple −48V DC power taps.

20 Claims, 2 Drawing Sheets

Express Power Load Center Block Diagram

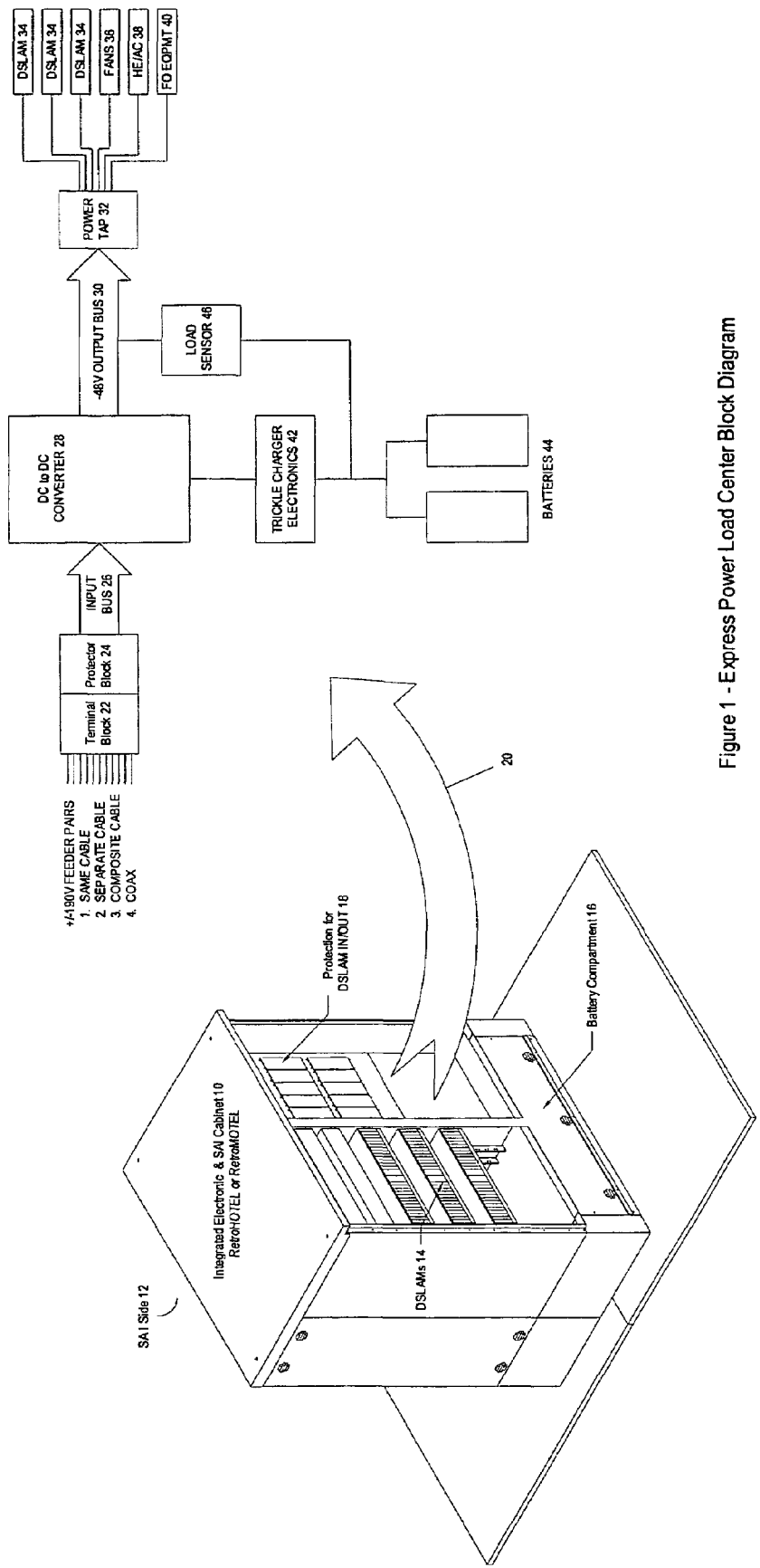
Figure 1 - Express Power Load Center Block Diagram

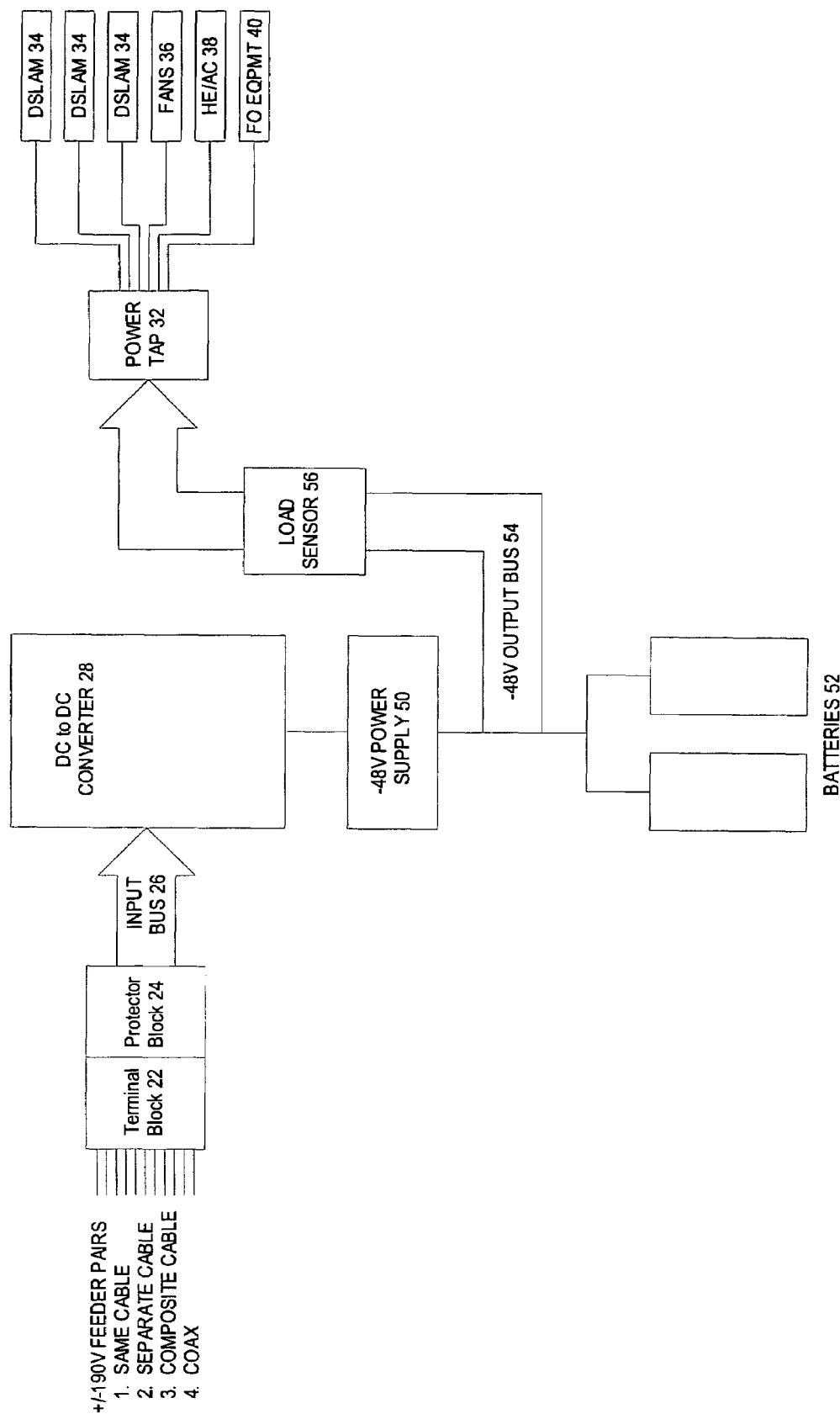
Figure 2 - Express Power Load Center Block Diagram

EXPRESS POWER LOAD CENTER

CROSS REFERENCE TO RELATED APPLICATIONS

The present invention is related to and claims the benefit of U.S. provisional patent application Ser. No. 60/598,861 entitled EXPRESS POWER LOAD CENTER, filed Aug. 4, 2004, assigned to the assignee of the present invention, the entire contents of each of which are incorporated by reference as if produced in their entirety herein. The present invention is further related to and claims the benefit of U.S. provisional patent application Ser. No., 60/424,277, entitled TELECOMMUNICATIONS INTERFACE, filed on Nov. 6, 2002 and U.S. non-provisional patent application Ser. No. 10/631,096, entitled TELECOMMUNICATIONS INTERFACE, filed on Jul. 31, 2003, U.S. provisional patent application Ser. No. 60/592,353 entitled REHABILATATING A SERVING AREA INTERFACE CABINET AND TERMINAL FIELD WITHOUT SERVICE INTERRUPTION, filed Jul. 29, 2004, U.S. non-provisional patent application Ser. No. 11/192,492, entitled REHABILITATING A SERVING AREA INTERFACE CABINET AND TERMINAL FIELD FOR BROADBAND SERVICES WITHOUT SERVICE INTERRUPTION, filed Jul. 29, 2005, U.S. non-provisional patent application Ser. No. 11/005,274 entitled REMOTE POWER NODE, filed Dec. 6, 2004, U.S. non-provisional patent application Ser. No. 11/021,883 entitled EMBEDDED HEAT EXCHANGER, filed Dec. 23, 2004, U.S. provisional patent application Ser. No. 60/628,433 entitled TELECOMMUNICATIONS INTERFACE ENHANCEMENTS, filed Nov. 16, 2004, U.S. provisional patent application Ser. No. 60/662,074, entitled DSLAM ENCLOSURE, filed Mar. 15, 2005, U.S. provisional patent application Ser. No. 60/662,073, entitled FTTC DSLAM OVERLAY, filed Mar. 15, 2005, and U.S. provisional patent application Ser. No. 60/662,072, entitled ENCLOSURE HOUSING MULTIPLE DSLAMs, filed. Mar. 15, 2005, assigned to the assignee of the present invention, the entire contents of each of which are incorporated by reference as if produced in their entirety herein.

FIELD OF THE INVENTION

The present invention is related to power provisioning and, more specifically, to an express power load center.

BACKGROUND OF THE INVENTION

Telephone companies are working on ways of extending broadband services to as many of their customers as possible. This means that they must find ways to reach substantially all their customers with digital subscriber lines (DSLs). In order to do so, they are installing more and more electronics such as DSLAMs and broadband loop carriers (BLCs) in remote locations away from central offices (COs) and remote terminals (RTs). Naturally, this electronic and fiber equipment needs to be powered. If local power is to be used, an AC service and an expensive AC to DC converter must be provided at the remote site, along with batteries for power backup and the recharging circuitry to go along with them. As an alternative to AC power, the concept of providing DC power from the CO or other convenient point by using existing copper cable feeder pairs has many advantages. However, connecting multiple cable pairs to each individual DLSAM or other device could prove to be unwieldy, costly and cumbersome. Termination of the pairs, electrical protection, and DC to DC conversion would need to be provided for each DSLAM, fan tray, fiber multiplexer, etc., sometimes at the board level. Clearly, a solution that overcomes these limitations is needed.

SUMMARY OF THE INVENTION

The present invention discloses an express power load center for use in powering remote telecommunication nodes, specifically nodes that have been created by a retrofit or rehabilitation of an existing service area interface cabinet (SAIC). Express power, which is also called network power or Optical Network Unit (ONU) power, allows a remote cabinet to be powered by sending power to the cabinet from another remote cabinet or from the CO. Such power can be transported to the remote site over twisted pair copper (either in the same cable sheath as voice and data or over a separate copper cable) or over copper conductors in composite cable (which includes fiber and copper in the same sheath) or over COAX. In all instances, an express power cable is connected to the remote cabinet via pin pairs in the express power protection panel or through express terminal blocks.

Express power is typically used in a number of scenarios. For example, AC power cannot be delivered to a remote site or cannot be delivered economically, greater reliability and control over cabinet powering is desired, a centralized power distribution scheme (such as fiber-to-the-curb, FTTC, or fiber-to-the-home, FTTH) is wanted, greater back-up power is desired, etc. Conventional line-powered systems must be designed for the peak load on the equipment it feeds. With the load varying over time (both short-term and long term) according to traffic on the DSLAM(s), such conventional designs are inefficient. When a DSLAM is first installed, the load will be small. As more customers are connected, both the average and peak loads will increase. When the first DSLAM is exhausted, and a second is installed, there will be a step function in the electrical load at the site. There are similar variations in the load represented by fans, battery heaters, and other ancillary devices. For example, the fans will not operate as much at night or in the winter, and the battery heaters will not typically operate in the summer. The present invention scales to match long term variances in the load. Further, batteries are used to "chop off the peaks" of the short term variances and feeder pairs can be added as necessary as customers and traffic grow at the site without using as many pairs as if the equipment was powered discretely.

In one embodiment, a power load center comprises a first terminal block adapted to receive multiple high voltage DC power feeder pairs, such as +/−190V DC, a DC to DC voltage converter adapted to receive aggregate feeder pairs and convert them to the required electronic supply voltage, typically −48V DC, and a second terminal block to provide multiple −48V DC power taps. A second embodiment incorporates the above high voltage converting mechanism, but also includes rechargeable batteries, battery heater, and the necessary electronic circuitry to recharge the battery as well as monitor its operation.

In another embodiment, a power load center comprises a first terminal block adapted to receive multiple high voltage DC power feeder pairs, a protector block adapted to receive the multiple high voltage DC power pairs from the first terminal block and to aggregate them, a DC to DC voltage converter adapted to receive the aggregate feeder pairs and convert them to −48V DC, and a power tap bus or second terminal block adapted to receive the −48V DC power and to output it as multiple −48V DC power taps.

In a further embodiment, a method for powering a combined electronic and serving area interface cabinet comprises receiving at least one high voltage power feeder pair, wherein the feeder pair is at least one of: +/−130V DC, around +/−130V DC, and above +/−130V DC, aggregating the at least one high voltage power feeder pair with at least one other high voltage power feeder pair, receiving the aggregate feeder pairs, converting the aggregate feeder pairs to at least one of: −48V DC, around −48V DC, and above −48V DC, receiving the converted power, and outputting the converted power as multiple power taps, wherein the power taps are at least one of: −48V DC, around −48V DC, and above −48V DC.

BRIEF DESCRIPTION OF THE DRAWINGS

FIG. 1 depicts an express power load center block diagram utilized in a combined electronic and SAI cabinet, wherein batteries are providing voltage for peak loads according to a preferred embodiment of the present invention; and FIG. 2 depicts an express power load center block diagram wherein batteries are utilized to provide voltage for the loads directly according to a preferred embodiment of the present invention.

DETAILED DESCRIPTION OF THE INVENTION

Referring now to FIG. 1, an integrated electronic and serving area interface (SAI) cabinet 10 is depicted. Such a cabinet is described in more detail in one or more of the pending cross-referenced patent applications. Generally, the integrated electronic and SAI cabinet 10 includes an SAI side 12, and an electronic side which includes DSLAMs 14, a battery compartment 16, and protection for DSLAM IN and OUT blocks 18. An express power load center of the present invention is depicted as being located in a housing 20 of the cabinet 10. Although depicted as such, the power load center may be housed in various other locations of the cabinet 10 and may be distributed throughout the cabinet 10.

The power load center of the present invention comprises a terminal block 22 which is adapted to receive incoming pairs, such as +/−190V DC feeder pairs, via a same cable, a separate cable, a composite cable, a coax cable, and the like. The terminal block 22 is operably coupled to a protector block 24. The incoming pairs are aggregated into an input bus 26. The +/−190V DC is then converted via a DC to DC converter 28 to −48V DC, sent via a −48V output bus 30 to a power tap 32 (or second terminal block). Individual −48V DC power connections are made to various components at a remote site such as DSLAMs 24, fans 36, heat exchangers and air conditioning 38, fiber optic equipment 40, and the like.

Trickle charger electronics 42 are coupled to the DC to DC converter 28 to provide trickle charging when a full charge is reached. The trickle charger electronics 42 are coupled to batteries 44 which are primarily used to provide additional power during peak demand and for additional usage requirements. A load sensor 48 is coupled to the batteries 44 and the output bus 30, to permit load sharing capabilities and to track the load to provide a smooth transfer of power.

In one embodiment, the present invention allows for the use of multiple high voltage power pairs, such as +/−190V DC, power pairs to provide power to the SAIC node. The incoming pairs are terminated on a block and aggregated into a power bus. The +/−190V DC is then converted via a DC to DC converter to −48V DC or other such voltage as required by the fiber and electronic equipment, and the output is available on multiple −48V DC taps. Individual −48V DC power connections are made to various electronic and fiber components present at the remote site such as: DSLAMs. Broadband Loop Carrier (BLC) equipment, battery heaters, battery recharging. circuitry, heat exchanger or air conditioning equipment, fiber optic equipment, cooling fan(s), and the like. Further, batteries are included to supplement power during peak loading of the electronic and fiber equipment. Although not a requirement, the power load center may be placed in a remote telecommunication node that is established by a retrofit or a rehabilitation of a serving area interface cabinet (also known as a cross-connect cabinet), or a retrofit or a rehabilitation of both a service area interface cabinet and a remote terminal (or digital loop carrier). Surge protection is also available for the high voltage power feeder pairs via a protector block, and rechargeable batteries can be used to supplement operating power during peak fiber and electronic equipment load periods.

The features of the present invention include:

1) An express power load center brings in multiple +/−190V DC power feeder pairs from the CO, a digital loop carrier remote terminal, a remote power node, or other remote location and terminates them at one place. It also outputs multiple −48V DC power taps at one place. This allows for load sharing thereby reducing the number of power pairs for each site. As previously noted, DC power can be sent to the cabinet via HDSL pairs, heavy gauge coax, and the like (which may be advantageous in cases where telcos are placing a new fiber feeder to the site). Further, voltages of +/−130V DC and above can be used without departing from the scope of the present invention;

2) By bussing the input and output power to one DC to DC converter, the converter function is not repeated at each DSLAM shelf, reducing board components and space;

3) Wiring is simplified, since input and output power connections can be accommodated at one location;

4) Integral surge protection of the incoming feeder pairs can be provided via the input bus prior to the converter without the need to protect each feeder pair from surges and other transient voltages;

5) The unit could turn on indications when the load nears capacity. This could signal the telco to hook up some more power feeder pairs. It would also alarm the telco to the fact that one or more power input pairs may have failed; and 6) A potential problem with express power is that, as the cabinet gets filled with equipment, the power load during peak periods can exceed what can be supplied from a reasonable number of +/−190V DC power pairs. In one embodiment of the present invention, a plurality of rechargeable batteries (which are, for example, Lithium batteries because of their size and maintainability) are used to supplement the power inputs during such peak periods. These batteries are not back-up batteries (which can be utilized by the express power load center). As such, there is no need to provision around 8 hours of capacity. The express power load center trickle-charges the plurality of batteries during low usage times, and then brings them on line when the voltage on the −48V DC bus falls below a predetermined level.

Referring now to FIG. 2, another power load center of the present invention, which may be used in a number of cabinets, comprises a terminal block 22 (which is adapted to receive +/−190V DC feeder pairs) which is operably coupled to a protector block 24. The incoming pairs (which, for example, currently exist and are received from an existing facility) are aggregated into an input bus 26. The +/−190V DC is then converted via a DC to DC converter 28 to −48V DC, sent via a −48V output bus 54 to a power tap 32 (or second terminal block) via a load sensor 56 that permits load sharing and tracking capabilities to provide a smooth transfer of power to individual −48V DC power connections made to various components at a remote site such as DSLAMs 24, fans 36, heat exchangers and air conditioning 38, fiber optic equipment 40, and the like. A −46V DC power supply 50 is coupled to the DC to DC converter 28 and to the batteries 52. In this scenario, the batteries 52 (and not the DC to DC converter 28) are providing all the load power.

The embodiments described above are only exemplary. Even though several characteristics and advantages of the present invention have been set forth in the foregoing description together with details of the method of the invention, the disclosure is illustrative only and changes may be made within the principles of the invention to the full extent indicated by the broad general meaning of the terms used in the attached claims.

What is claimed is:

1. A power load center, comprising: a first terminal block adapted to receive multiple high voltage DC power feeder pairs under normal operating conditions; a protector block adapted to receive the multiple high voltage DC power pairs from the first terminal block and to aggregate them; a DC to DC voltage converter adapted to receive the aggregate feeder pairs and convert them to a required electronic supply voltage; and a power tap bus adapted to receive the converted aggregate feeder pairs and to output them as multiple power taps.

2. The power load center of claim 1, wherein the power feeder pairs are +/−190V DC.

3. The power load center of claim 1, wherein the power feeder pairs are around +/−130V DC to more than +/−130V DC.

4. The power load center of claim 1, wherein the required electronic supply voltage is −48V DC.

5. The power load center of claim 1, wherein the multiple power taps are −48V DC power taps.

6. The power load center of claim 1, wherein −48V DC power connections are made to at least one of: DSLAMs; broadband loop carrier equipment; battery heaters; battery recharging circuitry; heat exchanger or air conditioning equipment; fiber optic equipment; and cooling fan(s).

7. The power load center of claim 1 comprising multiple +/190V DC power pairs to provide multiple −48V DC power taps.

8. The power load center of claim 1 comprising batteries to supplement power during peak loading of electronic and fiber equipment.

9. The power load center of claim 1, wherein the power load center may be placed in a remote telecommunication node.

10. The power load center of claim 1, wherein the remote telecommunication node is established by a retrofit or a rehabilitation of a serving area interface cabinet.

11. The power load center of claim 1, wherein the remote telecommunication node is established by a retrofit or a rehabilitation of both a service area interface cabinet and a remote terminal.

12. The power load center of claim 1 comprising surge protection for the high voltage power feeder pairs.

13. The power load center of claim 1 comprising rechargeable batteries used to supplement operating power during peak fiber and electronic equipment load periods.

14. A power load center, comprising: a first terminal block adapted to receive multiple high voltage +/−190V DC power feeder pairs under normal operating conditions; a protector block adapted to receive the multiple high voltage DC power pairs from the first terminal block and to aggregate them; a DC to DC voltage converter adapted to receive the aggregate feeder pairs and convert them to −48V DC; and a second terminal block adapted to receive the −48V DC power and to output it as multiple. −48V DC power taps.

15. The power load center of claim 14, wherein the power feeder pairs are received from an existing facility.

16. The power load center of claim 14, wherein the power feeder pairs are existing feeder pairs.

17. The power load center of claim 14, wherein a reduced number of power feeder pairs are needed, and wherein such a reduced number is based on load sharing across the center.

18. The power load center of claim 14, wherein the DC to DC voltage converter is not repeated at each shelf in the center, wherein the shelf is a DSLAM.

19. The power load center of claim 14, wherein received and output power connections can be accommodated at one location.

20. A method for powering a combined electronic and serving area interface (SAI) cabinet, comprising: receiving at least one high voltage power feeder pair under normal operating conditions, wherein the feeder pair is at least one of: +/−130V DC; around +/−130V DC; and above +/−130V DC; aggregating the at least one high voltage power feeder pair with at least one other high voltage power feeder pair; receiving the aggregate feeder pairs; converting the aggregate feeder pairs to at least one of: −48V DC; around −48V DC; and above −48V DC; receiving the converted power; and outputting the converted power as multiple power taps, wherein the power taps are at least one of: −48V DC; around −48V DC; and above −48V DC.

* * * * *